United States Patent [19]

Elliott et al.

[11] Patent Number: 4,786,351
[45] Date of Patent: Nov. 22, 1988

[54] PROCESS AND APPARATUS FOR SIMULTANEOUSLY SHAPING FOAM AND LAMINATING FABRIC THERETO

[75] Inventors: George M. Elliott, Alpharetta; Archie Solomon, Atlanta; Michael L. Avery, Cumming, all of Ga.

[73] Assignee: Astechnologies, Inc., Roswell, Ga.

[21] Appl. No.: 831,514

[22] Filed: Dec. 31, 1985

[51] Int. Cl.$^4$ .......................................... B32B 31/06
[52] U.S. Cl. .................................. 156/245; 156/285; 156/306.6; 156/313; 156/497; 156/498; 156/500; 29/91.1; 264/101; 425/407; 425/408; 425/405.1
[58] Field of Search ............... 156/196, 198, 242, 245, 156/285, 306.6, 313, 497, 498, 500; 264/82, 101, 102; 425/405 R, 407, 408, 411, 420; 29/91.1

[56] References Cited

U.S. PATENT DOCUMENTS

| | | | |
|---|---|---|---|
| 2,986,777 | 6/1961 | Carter | 264/101 |
| 3,242,510 | 3/1966 | Goldston | 5/345 |
| 3,406,235 | 10/1968 | Trogdon et al. | 264/321 |
| 3,654,019 | 4/1972 | Cusick | 156/285 |
| 3,657,044 | 4/1972 | Singer | 156/285 |
| 3,758,358 | 9/1973 | Kuroda | 156/222 |
| 3,891,738 | 6/1975 | Shen | 264/101 |
| 3,992,238 | 11/1976 | Johns | 156/285 |
| 4,121,960 | 10/1978 | Focht | 156/219 |
| 4,124,421 | 11/1978 | Fujii | 156/581 |
| 4,199,390 | 4/1980 | Pollard | 156/209 |
| 4,229,240 | 10/1980 | Borgleai | 156/214 |
| 4,260,575 | 4/1981 | Thew et al. | 264/154 |
| 4,264,386 | 4/1981 | Sears et al. | 156/245 |
| 4,313,776 | 2/1982 | Urai et al. | 156/220 |
| 4,323,410 | 4/1982 | Urai | 156/228 |
| 4,379,101 | 5/1983 | Smith | 264/40.3 |
| 4,400,422 | 8/1983 | Smith | 156/209 |
| 4,469,655 | 9/1984 | Kiss | 264/82 |
| 4,718,153 | 1/1988 | Amitage et al. | 156/72 |

Primary Examiner—Caleb Weston
Attorney, Agent, or Firm—Sutherland, Asbill & Brennan

[57] ABSTRACT

A machine for laminating fabric (123) to open cell cushion foam (124) while forming design lines in the foam is disclosed. The machine comprises a top hollow die (21) having perforations (38) and a complementary, hollow bottom die (54) which also has perforations (130). Hot melt adhesive (125) is interleaved between fabric (123) and foam (124). Top die (21) is preheated to just below the melt point of adhesive (125); then dies (21) and (54) are closed against the layered workpiece, with top die (21) contacting the face of fabric (123). A shot of superheated steam, e.g., at 80 psig and 700° F., is ejected from perforations (38) and (130) to melt adhesive (125). Then a vacuum is applied to the perforations to pull ambient air through the workpiece and cool it. The resolidified ashesive (125) holds foam (124) in its deformed shape and laminates fabric (123) to the foam.

55 Claims, 6 Drawing Sheets

PROCESS AND APPARATUS FOR SIMULTANEOUSLY SHAPING FOAM AND LAMINATING FABRIC THERETO

This invention concerns a process and apparatus for shaping a pad of open cell cushion foam and simultaneously laminating upholstery fabric to the foam.

It is often desired to have indentations in upholstered foam cushions, especially when the cushions are to be used in automobile interiors. Such indentations are sometimes referred to as design lines. They are used, for example, to create channeled, bisquit, or quilted effects.

The conventional method of creating design lines is by sewing the fabric to the cushion, using a backing material. A newer method involves forming the foam in a closed, heated mold, lined with the decorative face fabric, the fabric having a moisture-proof backing. The mold cavity is in the desired shape of the finished cushion. An adhesive can be added to the foam-producing mixture to cause the fabric to laminate to the foam as it is formed.

When the cushion is sewn, the design lines are created by stitching that passes through the foam and is anchored to the backing material. When the cushion is molded, the design lines are created by the design of the mold.

The sewing process is directly labor intensive. Less direct labor is involved in the molding process, but the molding process is difficult to control. Also, the cycle time of the molding process is relatively long, which necessitates a considerable capital investment in molds, in order to support high production volumes.

The present invention is directed to a process and a machine for producing shaped foam pads covered with upholstery fabric, which works relatively quickly and without sewing. The process comprises the following sequential steps:

(a) placing a layer of hot melt adhesive over one side of the foam pad, (b) overlaying the adhesive with the upholstery fabric, (c) pressing a preheated die against the fabric-covered side of the foam pad, thereby bending or indenting the pad in at least one location, the die being perforated across substantially its entire contact surface, (d) ejecting a shot of superheated vapor through the perforations in the die at a temperature and pressure sufficient to melt the adhesive and push it at least part way into the interior of the foam, (e) passing a cooling gas through the foam, until the adhesive has resolidified, and (f) disengaging the die and the resultant laminated, shaped composition.

Preferably, the cooling gas is ambient air which is pulled through the foam by the application of a vacuum to the foam.

The process works by driving the molten adhesive into the interior of the foam while it is deformed by the die. When the adhesive solidifies it cements the compressed cells together, making the bend or indentation permanent. At the same time, the fabric is securely laminated to the surface of the foam, making it unnecessary to tack or sew it in place around the edges.

By preheating the die and using superheated vapor to melt the adhesive, vapor condensation on the fabric can be avoided. This reduces or eliminates spotting. Use of a vacuum to cool the adhesive aids in this objective, in that it removes the partially cooled vapor before condensation can occur.

In addition to speed and low labor costs, another benefit of the present process is that it can form rounded corners in an upholstery fabric without creating folds or wrinkles. The fabric is actually stretched by the heat and compression to make it conform exactly to the shape of the die, which becomes the shape of the foam pad as well. Fabrics we have successfully tested in this regard include both knits and woven fabrics. Circular jersey knits, raschel knits (both 44 gauge and 32 gauge), and tricot warp knits (2, 3, and 4-bar) have been used. The woven fabrics used include twills (both 2×2 and 2×1), flat wovens, and velours. The fibers successfully tried include polyester, nylon, rayon, wool, cotton, and elastomeric, or "stretch", fibers—alone and in various blends. Fabrics that include some amount of an elastomeric fiber probably work best in the present process. We have not yet found an upholstery fabric with which the process will not work, however.

The types of foam we have successfully tested in the process of the present invention are those composed of polyurethane, polyolefin, polyether, and polyester resins.

The adhesive used in the present process is a fabric adhesive which is substantially solid at room temperature and melts at an elevated temperature, e.g., about 140° F. or above. The melting point should not be so high that the fabric would be damaged by raising the temperature to the adhesive's melt point. Some fabrics will withstand temperatures as high as about 300° F. Different adhesives may be preferred for different applications. Most often, however, the adhesive will have a melting point within the range of about 190° to 250° F. To make cushions that meet the U.S. automotive industry's current wear requirements, use of an adhesive that melts in the range of about 220° to 240° F. is most preferred.

Sufficient adhesive should be used to cover substantially the entire surface of the foam pad and reach into the cells that are compressed beneath the indentations and at other points of deformation. If the adhesive is in particulate form, it can be sprinkled or otherwise applied to the foam pad. Use of a mesh or film of adhesive facilitates placement of the adhesive between the fabric and the foam.

Any suitable way of interposing a layer of the adhesive between the fabric and the foam can be used. Thus, for example, instead of using separate adhesive, the fabric can be adhesive-backed, or the foam can be precoated with heat-activated adhesive.

Some commercially available foams especially designed for high temperature shaping have a heat-activated adhesive dispersed throughout them. These foams also can be used in the present process. They are less desirable, however, because they are more expensive than the combination of plain foam and separate adhesive.

The die should be preheated prior to being pressed against the layered composition of fabric, adhesive, and foam. Precisely how hot the contact surface of the die should be, depends upon the melting point of the adhesive. It should be hot enough to warm the adhesive to near its melting point. For most adhesives it will be preferred that the surface temperature of the die be below the adhesive's melting point, e.g., below the melt point but within about 10 to 30 Fahrenheit degrees thereof.

The preferred means of preheating the die is by use of electrical resistance heating. Preferably, the controls for the preheating means will be sensitive enough that the difference between the warmest and coolest points on the contact surface of the die will not be more than about 10 Fahrenheit degrees when the die is brought into contact with the fabric.

The perforations in the die should be relatively small, e.g., having diameters in the range of about 0.035 to 0.065 inch. There should be enough of the perforations, and they should be spaced closely enough together, to insure relatively uniform heating of the adhesive. The smaller the perforations, the closer together they should be. Generally, the perforations should be spaced not more than about ½ inch apart.

The preferred superheated vapor is steam. Preferably it will have a temperature in the range of about 400° to 750° F. and a pressure of about 75 to 90 pounds per square inch gauge (psig). Most preferred is a steam temperature of about 650° to 750° F.

The cooling gas preferably is activated as soon as injection of the superheated vapor ceases. We are not aware of any criticality in the rate at which the cooling gas is passed through the foam. The greater the flow rate, however, the sooner the adhesive will set. If the cooling gas is ambient air, and if it is pulled through the foam by application of a vacuum to the foam, a desirable vacuum strength range is about 5 to 8 inches of water, measured at an air flow rate of 750 cubic feet per minute (cfm).

In a preferred embodiment the layered composition of foam, adhesive and fabric is compressed between a pair of complementary dies. The greater the shaping to be done, the more advantageous it is to use such front and back dies. When two dies are used, preferably both will be perforated across substantially their entire contact surfaces. In that case, the vacuum preferably is pulled through the perforations in the second die, i.e., the one that presses against the opposite side of the foam from the fabric. This helps hold the workpiece in place. The vacuum can be applied through the perforations in both dies, however, if desired.

An optional step that can be employed in the process is to eject a shot of hot air from the perforations in the first die when the die is first pressed against the fabric, so as to preheat the adhesive before melting it with the super-heated vapor. Also, hot air can be ejected through the perforations of either or both dies after the superheated vapor ejection is over, so as to help dry the fabric and equipment and prevent the vapor from condensing and spotting the fabric. It often will be preferred, for example, to dry the fabric by ejecting hot air from the first die, while pulling a vacuum on the second die.

For purposes of preheating the adhesive it is preferred that the hot air be at a temperature of about 350° to 450° F. and a pressure of about 70 to 90 psig.

If it is desired to produce an especially deep design line in the cushion when using the process of the present invention, one can use two or more layers of foam, with adhesive in between. Multiple foam layers of different widths or lengths also can be used if the thickness of the finished cushion is to vary substantially from one edge to the other. When using multiple layers of foam, the present process can be applied as each layer is added, or it can be applied once to the entire stack, for a long enough time to penetrate all the layers of the composite. If a deep design line is wanted, the top foam layer of the composite can be made about as thick as the intended depth of the design line. The temperature and pressure of the ejected vapor should be high enough to melt the internal layer of adhesive, as well as the adhesive layer adjacent to the fabric. When the adhesive resolidifies, the layers of foam will be glued together and the deep indentation will be fixed in the foam, through the action of the internal layer of adhesive. Simultaneously, the fabric will be glued to the top layer of foam.

The procedure just described is especially advantageous if the design line is to be more than about one inch deep. It is difficult to melt a surface layer of adhesive and push it more than an inch into the foam, without excessive diffusion of the adhesive through the foam occurring, with a resultant weakness in the bonds that cement the collapsed cells together. Adhesive that is pre-postioned deep inside the foam can be heated to melting, however, without significant diffusion. The preferred technique for forming deep design lines, then, is to use two layers of foam, separated by an adhesive layer at approximately the depth where the indentation will bottom. Shallower design lines can also be formed at the same time, using the top layer of adhesive. If desired, even three or more layers of foam can be laminated together in this fashion, with one or more design lines terminating at about the level of each internal layer of adhesive. In this manner one can create any number of different design line depths, all in one operation.

The apparatus we have designed for practicing the process of the present invention comprises the following elements:

(a) means for releasably holding a workpiece pad of deformable material, (b) one or two dies as described above, (c) means for pressing the first die against the workpiece pad while the pad is being held by the holding means, (d) means for preheating the die, (e) means for ejecting a shot of superheated vapor through the perforations in the die, (f) means for passing a cooling gas through the workpiece pad while the die is pressed against it, and (g) means for disengaging the die and the pad so as to permit the shaped pad to be withdrawn from the apparatus.

Preferably, each die will have an enclosed chamber behind its contact surface, and this chamber will be in communication with the perforations in the die and with a valved source of the superheated vapor. It is also preferred that a valved vacuum line be connected to the chamber behind the contact surface of each die. If hot air is to be used, the chamber preferably is in communication with a valved source of that as well. The hot air is a more useful feature for the first die than for the second die.

To preheat each die it is preferred that one or more electrical resistance heater elements be attached to it. Preferably the preheat means will be operable to heat the die to a contact surface temperture of at least about 160° F., e.g., to somewhere in the range of about 160° to 240° F.

The apparatus preferably includes adjustable stop means for controlling the extent to which the die is pressed against the foam pad.

It is also preferred that the holding means be operable to hold the workpiece pad in a horizontal position, and that the first die be suspended above the place where the workpiece pad is held. Any rigid horizontal surface can serve as the holding means. If complementary dies are used, the holding means can be the second (or lower) die.

The pressing means can be operable to lower the die into contact with the workpiece pad. The pressing means can advantageously include one or more rack and pinion mechanisms for guiding the first die as it is lowered into contact with the pad. The disengaging means can operate to raise the die away from the pad.

The dies may be made of various metals; however, cast aluminum is preferred. The first die can be cast in one piece, or it can include one or more detachable, perforated protrusion sections for forming the indentations in the foam pad. An advantage of the latter arrangement is that it enables a single die to be adapted for use to create a variety of different designs, just by changing the protrusion sections.

For a fuller understanding of the apparatus and process of the present invention, reference is made to the drawings that accompany this specification. They depict a preferred embodiment of the apparatus and show how it works. Referring to the drawings:

FIG. 11 is a front view, in partial cross-section, of a differently shaped upper die than that depicted in FIGS. 1-9, used without a lower die. Also, FIG. 11 shows a workpiece containing two foam pads, rather than one.

Figure 1:
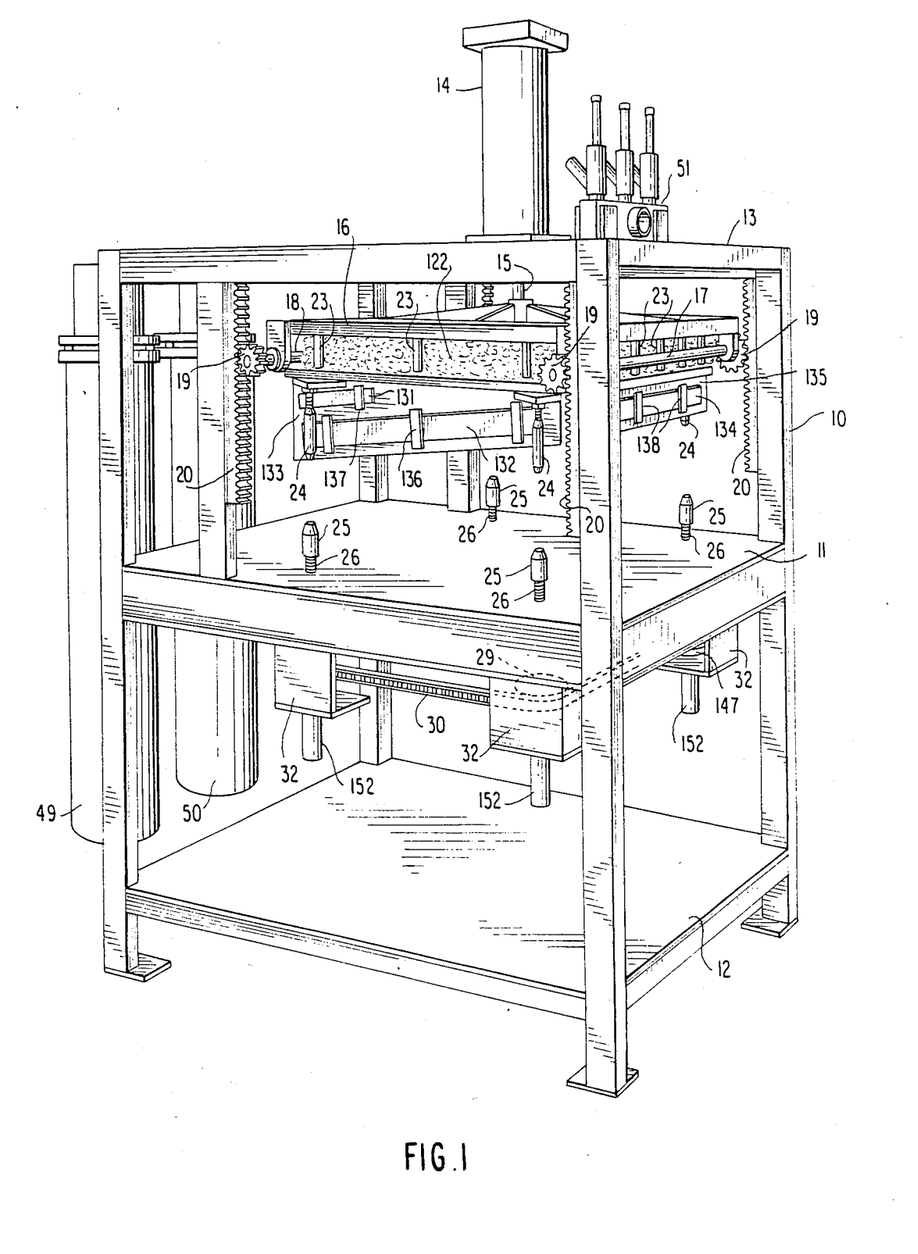
FIG. 1 is an isometric perspective view of the apparatus, using only an upper die. For ease of viewing, the piping that brings superheated steam, vacuum, and hot air to the die is omitted in this view.

The apparatus shown in the drawings comprises a four-legged frame 10 with an upper shelf 11, a bottom shelf 12, and a top 13. Mounted on top 13 is an operating cylinder 14, which drives a vertically reciprocable piston 15. Attached to the outside end of piston 15 is die holding plate 16. Rotatable shaft 17 is mounted on the front of plate 16. A parallel shaft 18 is mounted on the rear of plate 16. On all four ends of shafts 17 and 18 are fastened pinions 19. Vertically aligned racks 20 are mounted between top 13 and upper shelf 11 to mesh with each of the four pinions 19. This rack and pinion mechanism serves to keep plate 16 from twisting or tilting as it is raised or lowered.

Figure 3:
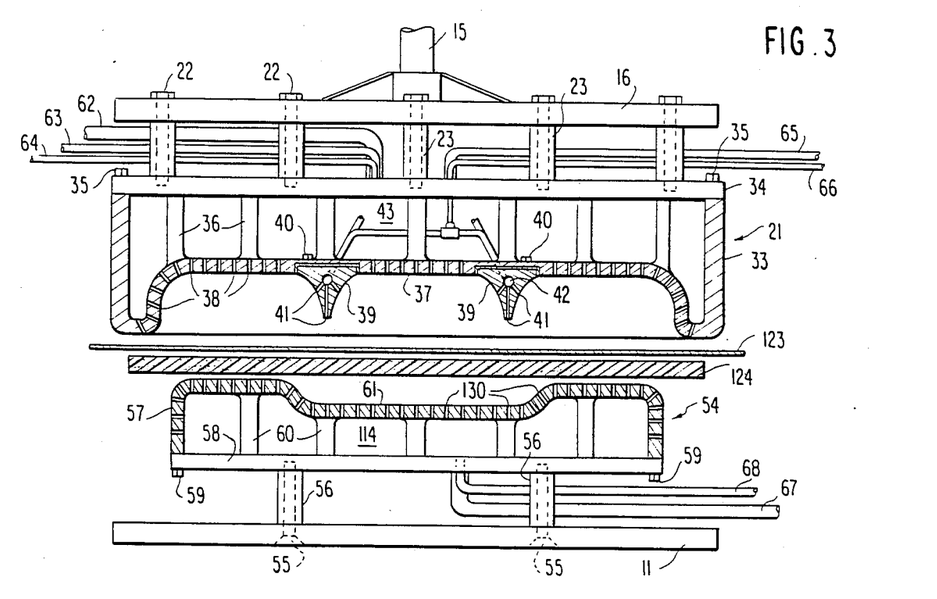
FIG. 3 is a front view, partially cut away, of the upper and lower dies, with the insulation removed, showing a fabric-covered foam pad in position to be worked upon.

As best seen in FIG. 3, top die 21 is held to plate 16 by bolts 22. Spacer collars 23 hold plate 16 and die 21 apart, so as to leave space for flexible piping that communicates with the interior cavity 43 of die 21.

Figure 14:
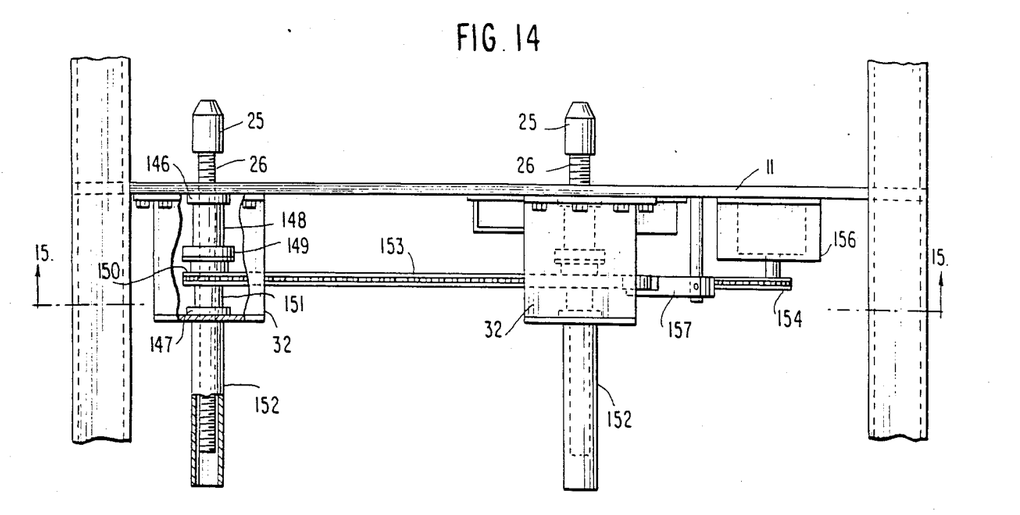
FIG. 14 is an enlarged side elevation (partially broken away) of top shelf 11 (FIG. 1) and the positioning assembly for bottom stops 25.
Figure 15:
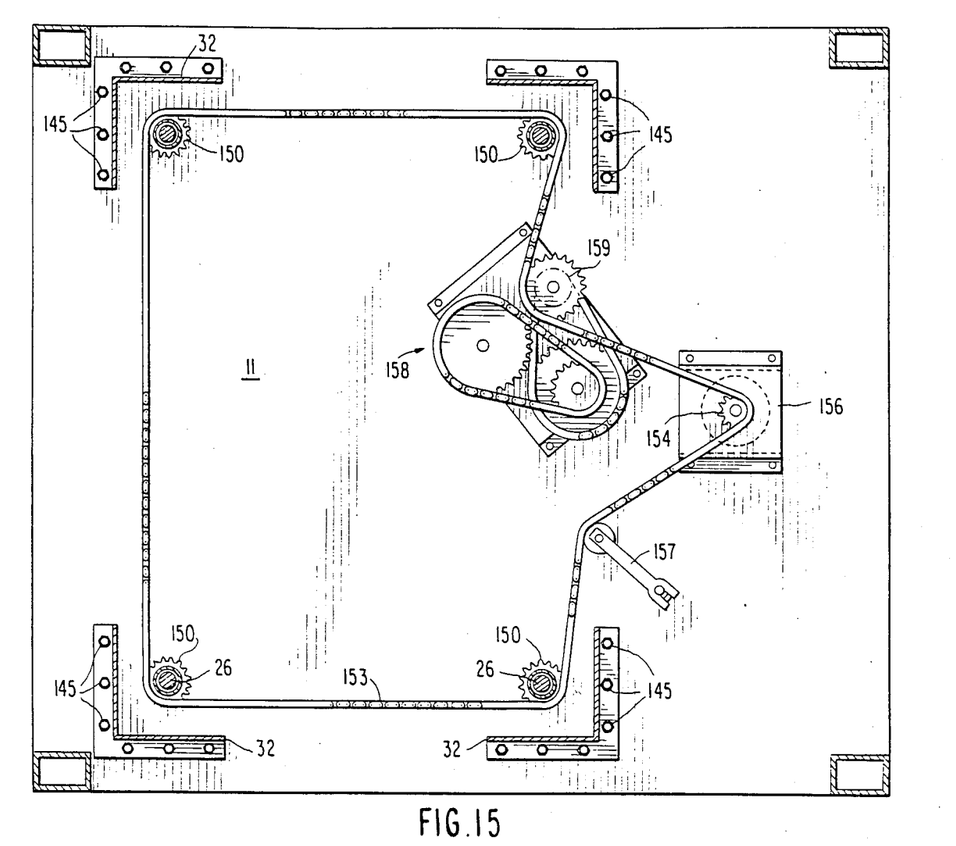
FIG. 15 is a bottom sectional view, taken along the line 15—15 in FIG. 14.

As illustrated in FIG. 1, four adjustable stops 24 are mounted near the four corners of upper forming die 21. As seen in FIGS. 1, 14, and 15, mounted on upper shelf 11 are four cooperating bottom stops 25. Each bottom stop 25 is mounted on a threaded shaft 26. Each shaft 26 passes through shelf 11 and housing 32, which is held to shelf 11 by screws 145. A pair of thrust bearings 146 and 147 are carried by housing 32. Shaft 26 is threaded through ball nut 148. Flange 149 of ball nut 148 is fastened to sprocket wheel 150. Spacer sleeve 151 is attached to the opposite side of sprocket wheel 150. The upper end of ball nut 148 rides inside thrust bearing 146. The lower end of spacer sleeve 151 rides inside thrust bearing 147. The mechanism works in the following way. As sprocket wheel 150 is turned, ball nut 148 turns with it. Ball nut 150 has ball bearings inside it that ride between the threads, making it a very low friction nut. Thus, as ball nut 148 turns, shaft 26 moves axially, without rotating. The lower end of shaft 26 is encased in a protective cover 152.

If necessary, a slot and key arrangement (not shown) can be provided to ensure that shaft 26 does not rotate when ball nut 148 is turned. Thus, for example, a longitudinal slot can be cut in the surface of shaft 26, and a key member which rides in the slot can be fastened to shelf 11. This will permit shaft 26 to move axially, but not turn.

Each sprocket wheel 150 is driven by drive chain 153, which, in turn, is driven by drive sprocket 154. Drive sprocket 154 is mounted on drive shaft 155 of direct current stepper motor 156. The tension in drive chain 153 is set by tension adjuster 157.

Indicated generally by reference numeral 158 in FIG. 15 is a pulse generator that is electrically connected to stepper motor 156 (connection not shown). Generator 158 works by energizing stepper motor 156 just long enough for a preset number of teeth on sprocket wheel 159 to pass by a sensor (not shown). Once wheel 159 has rotated that amount, motor 156 is deenergized. In this manner all four bottom stops 25 can be raised or lowered in unison a precise, incremental amount. The shortest amount is that produced by the rotation of sprocket wheel 159 the distance of just one tooth.

Figure 4:
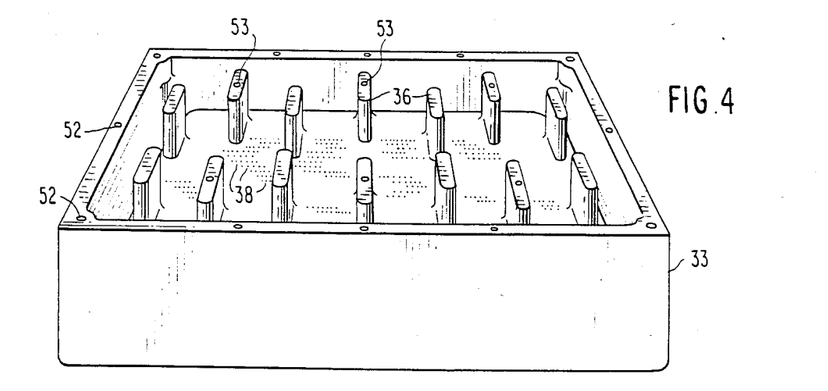
FIG. 4 is a top perspective view of the upper die with its cover removed.
Figure 5:
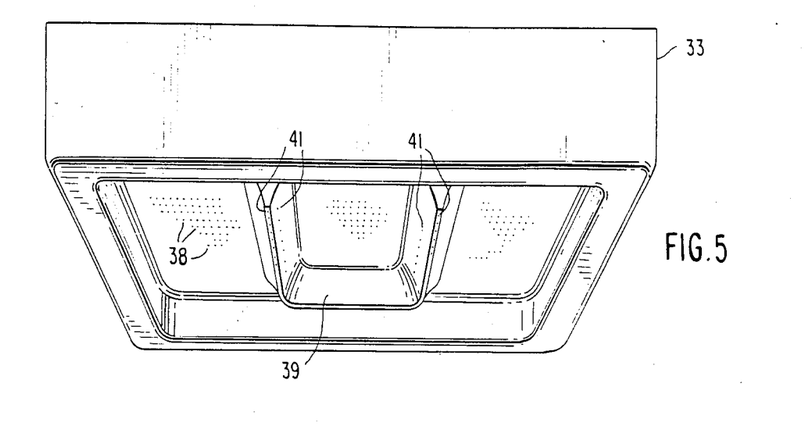
FIG. 5 is a bottom perspective view of the lower die.

As can be seen in FIGS. 3, 4, and 5, upper die 21 is comprised of a cast aluminum tray 33 with a detachable cover 34. Cover 34 is held to tray 33 by bolts 35, which are threaded into holes 52 in the corners and sides of tray 33 and into holes 53 in the support posts 36. Posts 36 provide structural stablity for upper die 21 and efficient heat transfer from electrically heated cover 34. The contact surface 37 of tray 33 is perforated. The preferred size and spacing of the holes 38 will vary according to the foam and fabric used, but, for example, as shown in FIGS. 4 and 5 the holes 38 may be on a 0.375 inch grid and have a diameter of 0.050 inch.

Figures 6, 7A, 7B, 8:
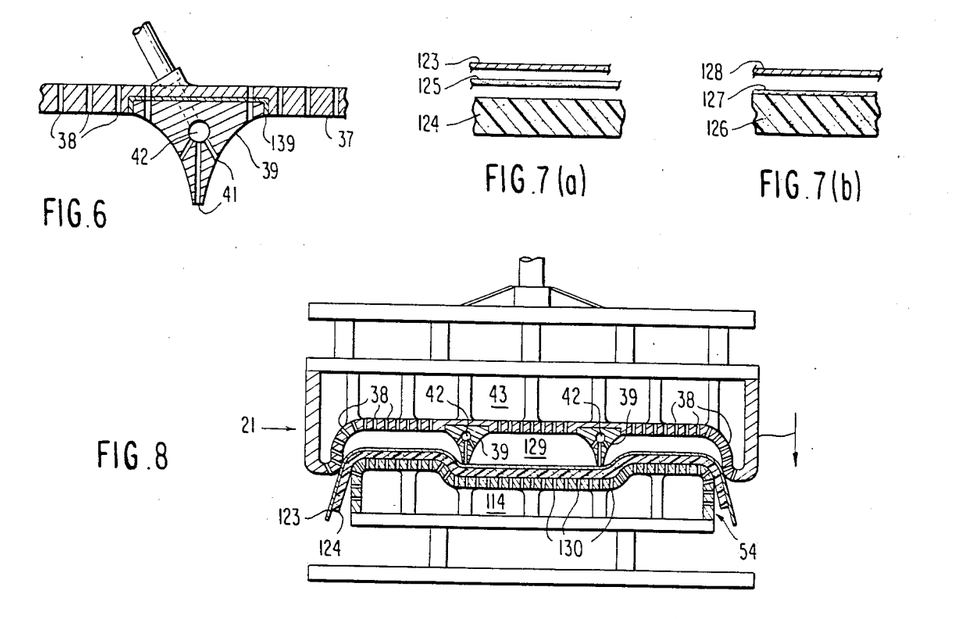
FIG. 6 is an enlarged sectional view of a portion of the upper die, which contains a detachable ridge section for forming a design line in the foam pad.
FIG. 7(a) is an exploded view of a section of the workpiece depicted in FIG. 3.
FIG. 7(b) shows an alternative layered composition to that depicted in FIG. 7(a).
FIG. 8 shows complementary upper and lower dies, in partial cross-section, just barely making contact with the layered composition between them.

On the underside 37 of tray 33 is mounted a U-shaped ridge section 39, which is held in place by bolts 40 (shown only in FIG. 3). Ridge section 39 is perforated with three rows of holes 41, all of which communicate with interior tunnel 42. Tunnel 42 runs substantially the entire length of ridge section 39. The joint between die underside 37 and ridge section 39 is sealed by a rubber gasket 139.

Figure 2:
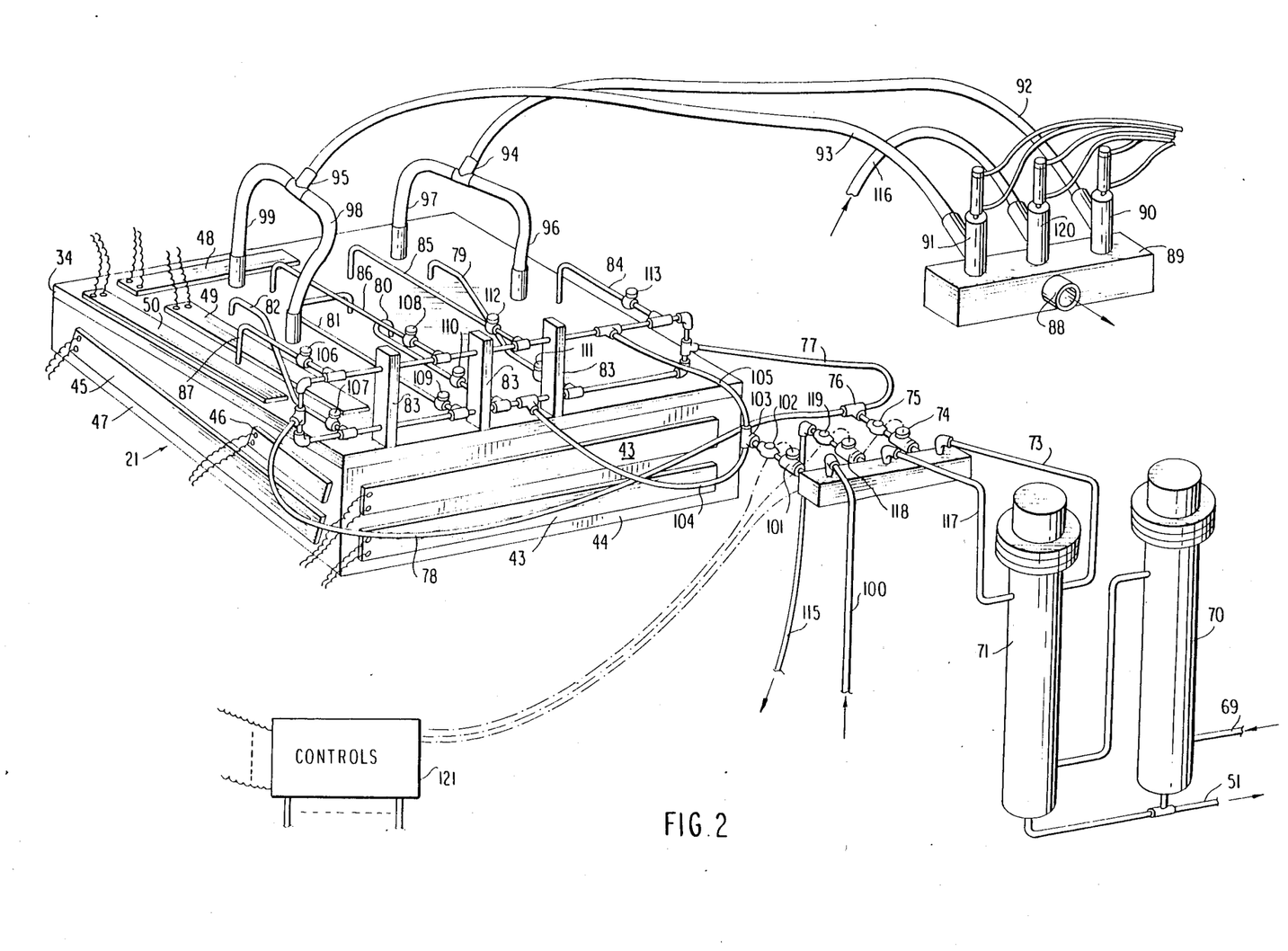
FIG. 2 is an isometric perspective view of the piping and controls for bringing superheated steam, vacuum and hot air to the upper die.

Electrical resistance heaters are attached to all four sides and top 34 of die 21. Illustrative heaters are shown in FIGS. 1 and 2. Thus, electric heaters 43 are attached to the rear 44 of die 21; electrical heaters 45 and 46 are attached to one side 47 of die 21; electrical heaters 131 and 132 are attached to the other side 133 of die 21; electrical heater 134 is attached to the front 135 of die 21; and electrical heaters 48, 49, and 50 are attached to the die top 34. Straps are used to hold the heaters in place. This is illustrated in FIG. 1, where straps 136 hold heater 132, strap 137 holds heater 131, and straps 138 hold heater 134.

As illustrated in FIG. 3, lower die 54, which is complementary to upper die 21, is mounted to upper shelf 11 by machine screws 55 and spacer collars 56. Lower die 54 consists of cast aluminum tray 57 and aluminum cover plate 58, which are held together by bolts 59. Tray 57 has integrally formed posts 60 which provide structural stability and enhanced heat transfer for die 54. The entire contact surface 61 of lower die 54 is perforated with holes 130, which are of the same diameter and spacing as holes 38 in upper die 21. Although not shown in the drawings, electrical resistance heaters are also attached to all four sides of tray 54 and to the outside of cover plate 58.

In FIG. 3, as indicated schematically, and partly broken away, three types of lines supply the interior cavity 43 between the cover 34 and tray 33 of upper die 21. These are vacuum line 62, hot air line 63, and superheated steam line 64. Similarly, tunnel 42 in ridge section 39 is supplied by hot air line 65 and superheated steam line 66. Lower die 54 is supplied by vacuum line 67 and superheated steam line 68.

Referring to FIG. 2, plant steam supplied by line 69 is superheated in two stages by electrical resistance heaters (not shown) in pressure vessel 70 and pressure vessel 71. The superheated steam is sent via line 73, solenoid valve 74, check valve 75, splitter 76, flexible trunk lines 77 and 78, and branch lines 79, 80, 81, and 82 to die cavity 43. (In this function branch lines 79, 80, 81, and 82 equate with superheated steam line 64, shown schematically in FIG. 3.) A portion of the superheated steam is routed to tunnel 42 in ridge section 39 by branch lines 84, 85, 86, and 87. (In this function branch lines 84–87 equate with superheated steam line 66, shown schematically in FIG. 3.) Condensate is removed from vessels 70 and 71 by line 51.

Vacuum pulled through trunk line 88 is connected to die cavity 43 via manifold 89, valves 90 and 91, hoses 92 and 93, splitters 94 and 95, and flexible branch lines 96, 97, 98, and 99. (Branch lines 96–99 equate with vacuum line 62, shown schematically in FIG. 3.)

Hot air supplied by line 100 is sent via solenoid valve 101, check valve 102, splitter 103, and flexible trunk line 104 to branch lines 79, 80, 81, and 82, which communicate with die cavity 43. (In this function, branch lines 79–82 equate with hot air line 63, shown schematically in FIG. 3.) Hot air from the same source also passes through flexible trunk line 105 to branch lines 84, 85, 86 and 87, which supply tunnel 42 in ridge section 39. (In this function, branch lines 84–87 equate with hot air line 65, shown schematically in FIG. 3.)

Braces 83 hold branch lines 79–82 and 84–87 to die cover 34. Manual control valves 106–113 adjust the flow in branch lines 79–82 and 84–87.

Although not illustrated in FIG. 2, lower die cavity 114 is similarly connected to superheated steam line 115 and to vacuum line 116. The superheated steam in line 115 is supplied by pressure vessel 71 via line 117, solenoid valve 118, and check value 119. The vacuum pulled through line 116 is controlled by vacuum valve 120.

Control panel 121, shown schematically in FIG. 2, is operatively connected to solenoid valves 74, 101, and 118, vacuum valves 90, 91, and 120, and electric heaters 43, 45, 46, 48, 49, and 50. In addition, the electric heaters (not shown) on the outside of lower die 54 are connected to control panel 121.

As shown in FIG. 1, glass wool insulation 122 is packed around all of the hot air and superheated steam lines entering top 34 of upper die 21. Similar insulation (not shown) is packed around the superheated steam line 68 entering lower die 54.

EXAMPLE 1

FIGS. 3, 8, 9, and 10 depict the use of the apparatus of the drawings to laminate fabric 123 to foam pad 124, and simultaneously shape the pad. As shown in FIG. 7a, a layer of adhesive 125 is interposed between fabric 123 and foam pad 124. (FIG. 7b shows an alternative configuration, where a foam pad 126 that has been pre-coated with a hot melt adhesive 127 is used underneath fabric 128.) Referring to these drawings, the following is an illustration of how the process can be conducted.

Upper die 21 is heated to a temperature of about 200° F. the electric heaters shown in FIGS. 1 and 2, while the die is in the raised position shown in FIGS. 1 and 3. Referring to FIG. 2, solenoid valves 74, 101, and 110 and vacuum valves 90, 91, and 120 are all closed. Manual valves 106–113 are open. Foam 124, a layer of powdered adhesive 125, and fabric 123 are placed on lower die 54, as shown in FIG. 3. Foam 124 is a one inch thick pad of open cell polyether. Adhesive 125 is Rilson No. 5000 polyamide. It has a particle size range of 200–500 microns and melts at about 220°–240° F. Fabric 123 is a woven velour, comosed 70% of polyester and 30% of Lycra ® spandex.

Plant steam at 350° F. and 80 psig is fed into pressure vessel 70, where it is heated to about 400° F. and 80 psig; then the steam is heated further in pressure vessel 71 to about 700° F. and 80 psig (measured at the entrances to die cavities 43 and 114).

Figure 9:
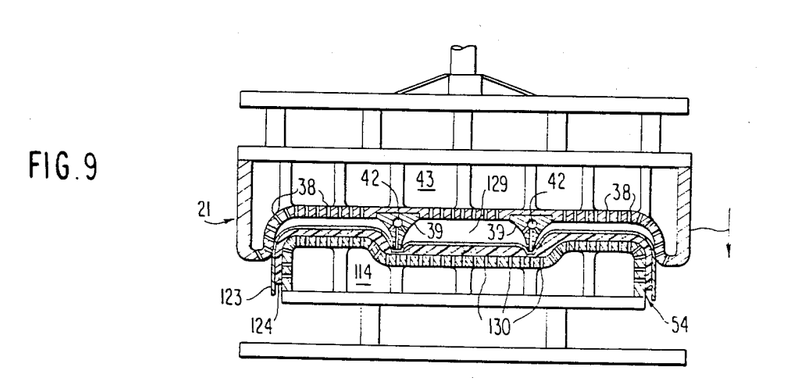
FIG. 9 shows the layered composition of fabric, adhesive and foam fully compressed between the upper and lower dies depicted in FIG. 8.
Figure 10:
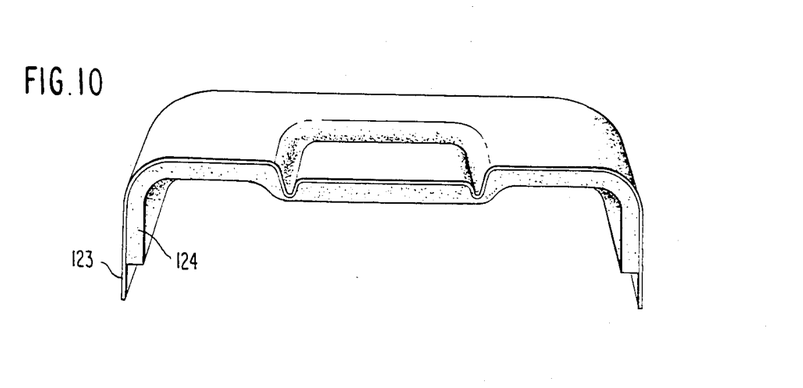
FIG. 10 is a top perspective view of the shaped, laminated article produced by the apparatus depicted in FIGS. 1-9, but cut in half to show its inner structure.

Upper die 21 is lowered onto the layered composition of fabric, adhesive, and foam pad (shown generally in FIGS. 8 and 9 as workpiece 129). FIG. 8 shows die 21 partially lowered; FIG. 9 shows it fully lowered. Ridge section 39 forms an indentation in workpiece 129 about one inch deep. Now solenoid valves 74 and 118 are opened for 20 seconds, allowing superheated steam to fill tunnel 42 and die cavities 43 and 114 and be ejected through perforations 38, 41, and 130 into workpiece 129. Adhesive 125 is melted by the contact with the superheated steam and is partially driven into the interior of foam pad 124. At the end of the 20 seconds, solenoid valves 74 and 118 are closed. Then solenoid valve 101 and vacuum valve 120 are opened for five seconds, causing air at a temperature of 400° F. and a pressure of 80 psig to be ejected through perforations 38 and 41 in upper die 21, while a vacuum of 7 inches of water at 750 cfm is pulled through perforations 130 in lower die 54. At the end of the 5 seconds, all the solenoid and vacuum valves are closed and upper die 21 is returned to its fully raised position, as shown in FIGS. 1 and 3. The resulting laminated, shaped cushion shown in FIG. 10 is lifted off lower die 54 and withdrawn from the apparatus. The cushion is suitable for use as a cap for an automobile seat. The fabric is substantially free of wrinkles, even at the corners. If it were separated from the foam pad, the fabric would retain the shape of the pad, much as if it had been knitted into that configuration.

EXAMPLE 2

Figure 11:
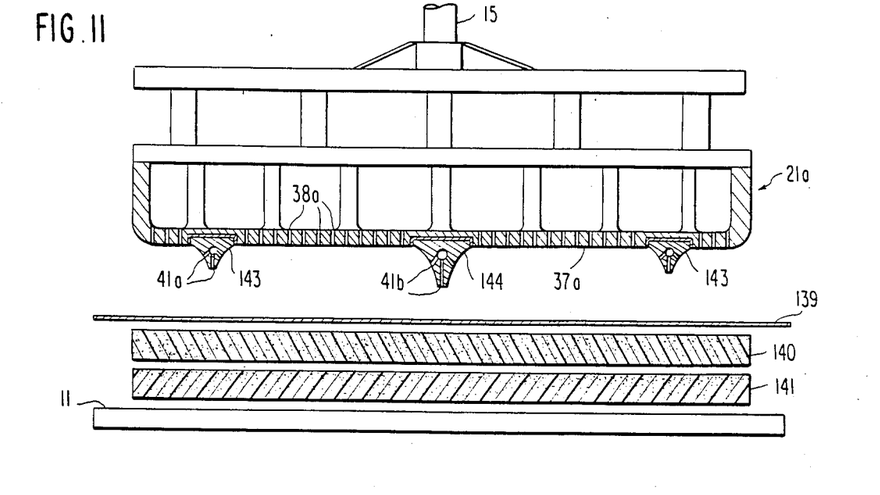
Figure 12:
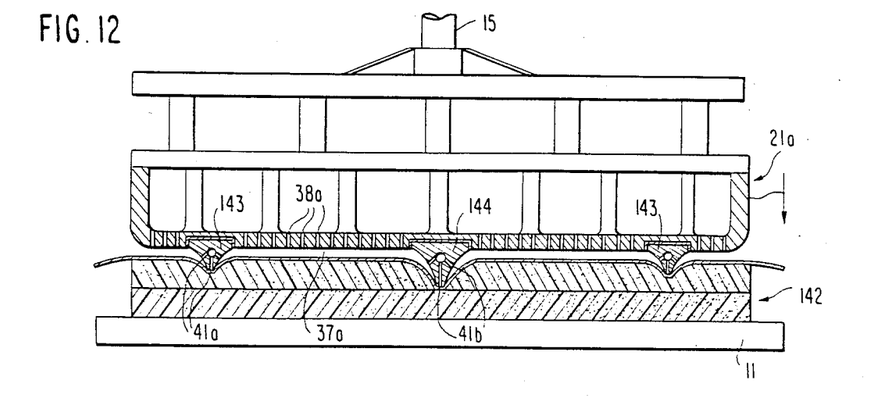
FIG. 12 depicts the upper die of FIG. 11 pressed against the workpiece pad.
Figure 13:
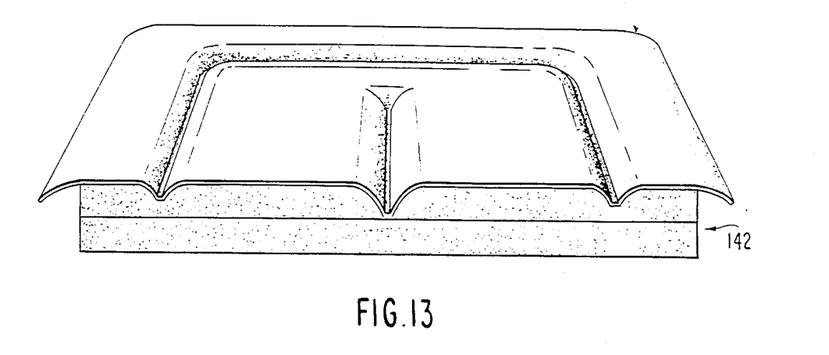
FIG. 13 is a top perspective view of the shaped, laminated product produced by the apparatus shown in FIGS. 11 and 12.

FIGS. 11, 12, and 13 depict the use of the apparatus of the drawings to laminate a triple layer of fabric 139, foam pad 140, and foam pad 141. Layers of hot melt adhesive are interposed between fabric 139 and foam pad 140 and between foam pad 140 and foam pad 141; for simplicity's sake, however, the adhesive layers are not shown in FIGS. 11 or 12. Both pads 140 and 141 are one inch thick and consist of open cell polyether foam. Fabric 139 is a 70/30 blend of polyester and Lycra spandex, woven into a velour. The adhesive used is Rilson 5000 polyamide. The layered composition (indicated generally as workpiece 142 in FIGS. 12 and 13) is placed on shelf 11. No lower die is used.

Detachably fastened to the contact surface 37a of die 21a are two ridge sections 143 and 144. Ridge section 144 protrudes approximately ½ inch further than ridge section 143.

Die 21a is heated by electrical resistance heaters (not shown) to about 200° F.; then, as shown in FIG. 12, die 21a is lowered and pressed against workpiece 142. Die 21a is lowered far enough that ridge section 144 makes a one inch deep indentation in workpiece 142 and ridge section 143 makes a ½ inch deep indentation therein.

A 16 second shot of superheated steam, at about 700° F. and 80 psig, is ejected from perforations 38a in surface 37a and from perforations 41a and 41b in ridge sections 143 and 144. At the end of the 16 seconds, a 7 inch (water) vacuum is pulled at 750 cfm through perforations 38a for 5 seconds. As soon as the vacuum is cut off, upper die 21a is raised away from shelf 11, permitting the finished cushion, shown in FIG. 13, to be withdrawn from the apparatus and installed in an automobile interior.

We claim:

1. A process of shaping open cell cushion foam and simultaneously laminating steam permeable fabric thereto, comprising the following steps:
   (a) placing a layer of hot melt fabric adhesive over one side of the foam,
   (b) overlaying the adhesive with the fabric,
   (c) pressing a contoured die against the fabric-covered side of the foam, thereby creating one or more bends or indentations in the foam, said die being perforated across substantially its entire contact surface and said contact surface being preheated to an elevated temperature, but said temperature being below the melting point of the adhesive,
   (d) ejecting a shot of superheated steam through the perforations in the die at a pressure sufficient to drive the steam through the fabric and force some of the adhesive at least part way into the interior of the foam, the temperature of the steam being high enough to melt the adhesive,
   (e) passing a cooling gas through the foam, until the adhesive has resolidified, thereby laminating the fabric to the foam and permanently fixing the bend(s) or indentation(s) in the foam, and
   (f) disengaging the die and the resultant laminated, shaped composition.

2. The process of claim 1 wherein the adhesive used in step (a) melts somewhere in the range of about 190° to 250° F., the superheated steam used in step (d) is at a temperature of about 400° to 750° F.; and, in step (e), the cooling gas is ambient air which is pulled through the foam by applying a vacuum to the foam.

3. The process of claim 2 wherein, in step (c), the layered composition of foam, adhesive and fabric is compressed between a pair of complementary dies, the first die pressing against the fabric and the second die pressing against the opposite side of the foam.

4. The process of claim 3 wherein the second die also is perforated across substantially its entire contact surface and, in step (e), the vacuum is pulled through the perforations in the second die.

5. The process of claim 2 wherein, in step (c), the die has been preheated to a temperature approximately 10 to 30 Fahrenheit degrees lower than the melting point of the adhesive.

6. The process of claim 4 wherein, in step (c), the die has been preheated to a temperature approximately 10 to 30 Fahrenheit degrees lower than the melting point of the adhesive.

7. The process of claim 5 wherein the steam used in step (d) is at a pressure of about 75 to 90 pounds per square inch gauge.

8. The process of claim 6 wherein the steam used in step (d) is at a pressure of about 75 to 90 pounds per square inch gauge.

9. The process of claim 7 wherein the steam used in step (d) is at a temperature of about 650° to 750° F.

10. The process of claim 8 wherein the steam used in step (d) is at a temperature of about 650° to 750° F.

11. The process of claim 5 wherein the foam is comprised of two or more layers of foam with hot melt adhesive in between; the die, in step (c), creates one or more indentations in the foam that reach approximately the depth of one or more of said internal layers of adhesive; and the temperature of the steam used in step (d) is high enough to also melt the internal layer(s) of adhesive, so that, in step (e), when all of the adhesive resolidifies, all of the layers of foam are glued together and the indentation(s) is (are) fixed in the foam by the internal layer(s) of adhesive.

12. The process of claim 7 wherein, in step (e), the vacuum is pulled through the perforations in the die.

13. The process of claim 3 wherein, in step (e), the vacuum is pulled through the perforations in the second die while hot air, at a temperature of about 350° to 450° F., is ejected through the perforations in the first die.

14. The process of claim 10 wherein, in step (e), the vacuum is pulled through the perforations in the second die while hot air, at a temperature of about 350° to 450° F., is ejected through the perforations in the first die.

15. The process of claim 10 wherein, between steps (c) and (d), a shot of hot air, at a temperature of about 350° to 450° F., is ejected from the perforations in the first die at a pressure of about 70 to 90 pounds per square inch gauge, so as to preheat the adhesive.

16. The process of claim 14 wherein, between steps (c) and (d), a shot of hot air, at a temperature of about 350° to 450° F., is ejected from the perforations in the first die at a pressure of about 70 to 90 pounds per square inch gauge, so as to preheat the adhesive.

17. The process of claim 9 wherein the adhesive is a polyamide melting somewhere in the range of about 220° to 240° F.

18. The process of claim 10 wherein the adhesive is a polyamide melting somewhere in the range of about 220° to 240° F.

19. The process of claim 6 wherein the foam is composed of a polyurethane, polyolefin, polyether, or polyester resin.

20. The process of claim 9 wherein the foam is composed of a polyurethane, polyolefin, polyether, or polyester resin.

21. The process of claim 18 wherein the foam is composed of a polyurethane, polyolefin, polyether, or polyester resin.

22. The process of claim 20 wherein, during steps (c) and (d), the temperature difference between the warmest and coolest points on the contact surface of the first die is held to not more than about 10 Fahrenheit degrees.

23. The process of claim 21 wherein, during steps (c) and (d), the temperature difference between the warmest and coolest points on the contact surface of each die is held to not more than about 10 Fahrenheit degrees.

24. The process of claim 23 wherein the foam is composed of a polyether resin.

25. An apparatus for shaping a piece of porous resilient material or for laminating steam-permeable fabric to a porous substrate, comprising
   (a) means for releasably holding a workpiece of the material to be acted upon,
   (b) a contoured die which is perforated across substantially its entire contact surface and which has an enclosed chamber behind its contact surface which is in communication with the perforations in the die,
   (c) means for pressing the die against one side of the workpiece while the workpiece is being held by said holding means,
   (d) means for preheating the die prior to pressing it against the workpiece,
   (e) means for supplying steam under pressure,
   (f) means for superheating the steam,
   (g) a steam line for delivery of the superheated steam under pressure directly to the enclosed chamber of the contoured die while the die is pressed against the workpiece,
   (h) valve means for opening and closing said steam line,
   (i) means for passing a cooling gas through the workpiece while the die is pressed against it, and
   (j) means for disengaging the die and the workpiece, so as to permit the finished workpiece to be withdrawn from the apparatus.

26. The apparatus of claim 25 wherein the die preheating means is operable to preheat the die to a contact surface temperature of at least about 160° F.; the steam supply and superheating means are operable to supply to the enclosed chamber superheated steam at some temperature in the range of about 400° to 750° F.; and the means for passing the cooling gas through the workpiece is operable to apply a vacuum to the workpiece, so as to pull ambient air through the workpiece.

27. The apparatus of claim 26 additionally comprising a second die which is complementary to the first die and which also is perforated across substantially its entire contact surface, said first and second dies being operable to compress the workpiece between them, and wherein said means for passing the cooling gas is operable to pull a vacuum through the perforations in the second die while the workpiece is compressed between the two dies.

28. The apparatus of claim 27 additionally comprising means for supplying hot air, at a temperature of about 350° to 450° F. and a pressure of about 70 to 90 pounds per square inch gauge, to the enclosed chamber of the first die, while the die is pressed against the workpiece.

29. The apparatus of claim 28 wherein the second die also has an enclosed chamber behind its contact surface which is in communication with the perforations in the die, said apparatus additionally comprising means for supply hot air, at a temperature of about 350° to 450° F. and a pressure of about 70 to 90 pounds per square inch gauge, to the enclosed chamber of the second die, while the die is pressed against the workpiece.

30. The apparatus of claim 26 wherein said means for passing the cooling gas is operable to pull a vacuum through the perforations in the die.

31. The apparatus of claim 27 wherein said means for passing the cooling gas is operable to also pull a vacuum through the perforations in the first die while the workpiece is compressed between the two dies.

32. The apparatus of claim 29 wherein said means for passing the cooling gas is operable to also pull a vacuum through the perforations in the first die while the workpiece is compressed between the two dies.

33. The apparatus of claim 32 wherein the holes in both dies have diameters in the range of about 0.035 to 0.065 inch and are spaced not more than about one-half inch apart.

34. The apparatus of claim 26 wherein the steam supply and superheating means are operable to supply to the enclosed chamber superheated steam at some temperature in the range of about 400° to 750° F. and some pressure in the range of about 75 to 90 pounds per square inch gauge.

35. The apparatus of claim 26 wherein the steam superheating means includes at least one enclosed vessel, means for introducing saturated steam to said vessel, means for heating saturated steam introduced to said vessel to a higher temperature, and means for maintaining steam present in the vessel at a substantially constant pressure while it is being heated to a higher temperature.

36. The apparatus of claim 26 additionally comprising adjustable stop means for controlling the extent to which the die is pressed against the workpiece.

37. The apparatus of claim 33 additionally comprising means to preheat the second die to a contact surface temperature of at least about 160° F. prior to the compression of the workpiece.

38. The apparatus of claim 37 additionally comprising adjustable stop means for controlling the extent to which the die is pressed against the workpiece.

39. The apparatus of claim 36 wherein the means for preheating the die comprises one or more electrical resistance heater elements attached to the die.

40. The apparatus of claim 38 wherein the means for preheating each die comprises one or more electrical resistance heater elements attached to the die.

41. The apparatus of claim 39 wherein the die is made of cast aluminum.

42. The apparatus of claim 40 wherein each die is made of cast aluminum.

43. The apparatus of claim 39 wherein the contact surface of the die includes a detachable, perforated ridge section for forming a design line in the workpiece.

44. The apparatus of claim 41 wherein the contact surface of the die includes a detachable, perforated ridge section for forming a design line in the workpiece.

45. The apparatus of claim 42 wherein the contact surface of the die includes a detachable, perforated ridge section for forming a design line in the workpiece.

46. The apparatus of claim 39 wherein the holding means is operable to hold the workpiece horizontally; the die is suspended above the holding means; the pressing means is operable to lower the die into contact with the workpiece; and the disengaging means is operable to raise the die away from the holding means.

47. The apparatus of claim 45 wherein the holding means comprises the second die, which is disposed horizontally; the first die is suspended above the second die; the pressing means is operable to lower the first die into contact with the workpiece; and the disengaging means is operable to raise the first die away from the second die.

48. The apparatus of claim 46 wherein the pressing means includes a rack and pinion mechanism for guiding the die as it is lowered into contact with the workpiece.

49. The apparatus of claim 47 wherein the pressing means includes a rack and pinion mechanism for guiding the first die as it is lowered into contact with the workpiece.

50. The apparatus of claim 35 wherein the means for heating the saturated steam includes an electrical resistance heater mounted inside the vessel.

51. The apparatus of claim 50 wherein the steam superheating means also includes a second enclosed vessel, means for passing steam from said first enclosed vessel to said second vessel, means for heating steam introduced to said second vessel to a higher temperature, and means for maintaining steam present in the second vessel at a substantially constant pressure while it is being heated to the higher temperature.

52. The apparatus of claim 51 wherein the means for heating the steam in said second vessel includes an electrical resistance heater mounted inside the vessel.

53. The apparatus of claim 52 wherein the holes in the die have diameters in the range of about 0.035 to 0.065 inch.

54. The process of claim 2 wherein the steam used in step (d) is at a pressure of about 75 to 90 pounds per square inch gauge.

55. The process of claim 54 wherein the adhesive used in step (a) is in particulate form.

* * * * *